July 3, 1951
H. S. JANDUS ET AL
2,558,958
BRAKE LEVER STRUCTURE
Filed March 9, 1946
2 Sheets-Sheet 1
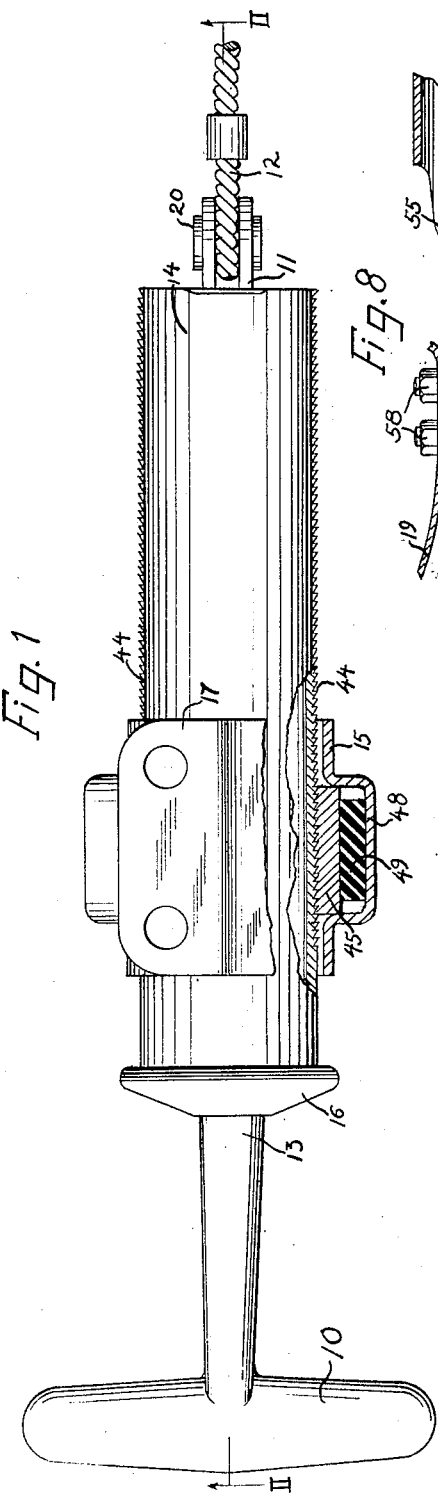
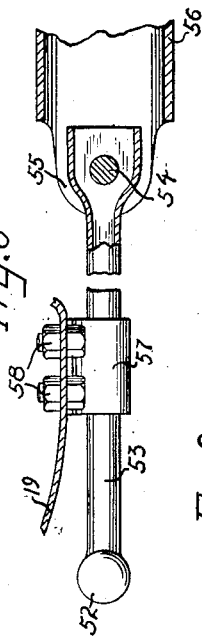
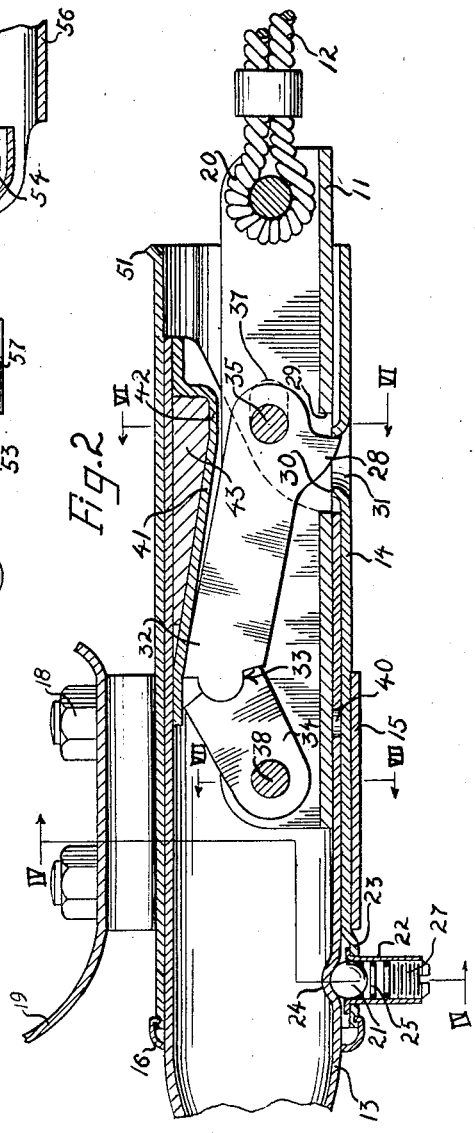
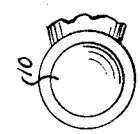
INVENTORS
HERBERT S. JANDUS
WALTER BANTA
BY

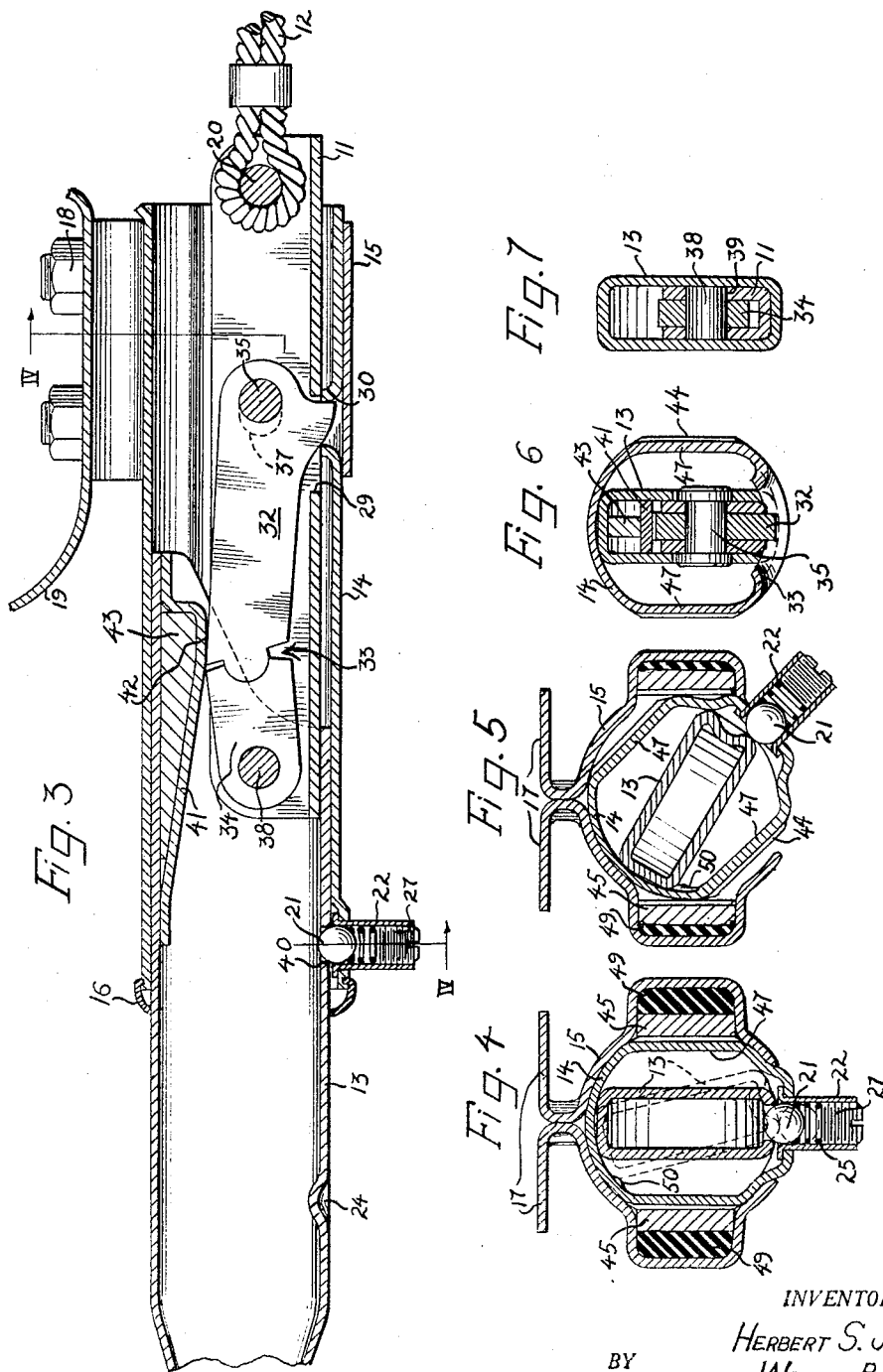

Patented July 3, 1951

2,558,958

UNITED STATES PATENT OFFICE 2,558,958

BRAKE LEVER STRUCTURE

Herbert S. Jandus and Walter Banta, Detroit, Mich., assignors to Houdaille-Hershey Corporation, Detroit, Mich., a corporation of Michigan Application March 9, 1946, Serial No. 653,235

19 Claims. (Cl. 74—503)

This invention relates generally to brake lever structures and more particularly concerns improvements in such structures especially useful for operating the emergency or parking brakes in automobiles and like vehicles.

In the operation of emergency brakes in automobiles and the like, it is desirable to effect both slack takeup and the final setting of the brake in one continuous motion of the brake lever. While the attainment of this general objective presents no great difficulty, a real problem is presented by the requirement for many times greater physical exertion to effect the final setting of the brake, as compared with the preliminary action of taking up slack. In fact, the final setting exertion is involved in but a relatively small increment of the total brake setting motion of the take-off or setting cable.

Because of the relatively great force required in the final brake setting increment of lever action, straight line brake levers, although obviously desirable due to greater economy of space and the advantages of convenient placement, have not been altogether satisfactory. The two main drawbacks have been the liability of the operator not thoroughly setting the brakes from failure to exert sufficient pull to thoroughly effect the final brake setting, and the liability of inordinate strain upon the mechanism as a result of conscientious operators over-exerting in setting the brakes. Some endeavor has been made to overcome these disadvantages by affording compound mechanical movements in the brake lever, but the mechanisms proposed have been unduly complex and most generally have required increased space both for the mechanism and for operational clearance.

An important object of the present invention is to provide a straight acting or direct pull brake lever structure which overcomes the foregoing and other shortcomings of this type of brake lever, and in which the final application of force to lock the brakes is accomplished with but a minimum of additional exertion over that required for taking up slack in the brake system.

Another object of the invention is to provide a direct pull brake lever structure which is positive in action, comprises relatively simple and rugged parts, and is easy and simple to operate.

Still another object of the invention is to provide in a direct pull brake lever structure improved means for non-slip, positive setting of the brake but which is easily and quickly releasable for releasing the brake.

Yet another object of the invention is to provide a direct pull brake lever structure which is especially adapted for conservation of space not only by reason of its small size and limited clearance requirements but because of its ready adaptability as to convenient placement.

A further object of the invention is to provide an exceptionally quietly operating brake lever structure.

Another and general object of the invention is to provide a direct pull brake lever structure which is particularly suitable for low-cost mass production manufacture.

Other objects, features and advantages of the present invention will be readily apparent from the following detailed description of certain preferred embodiments thereof, taken in conjunction with the accompanying two sheets of drawings, in which:

Figure 1 is a top plan view of a brake lever structure according to the present invention, partially broken away and in section to reveal certain features of construction;

Figure 2 is a fragmental longitudinal sectional view through the brake lever structure taken substantially along the line II—II of Figure 1 and showing the relationship of parts in the fully released condition of the structure;

Figure 3 is a fragmentary sectional view similar to Figure 2 but showing the relationship of parts in the full brake setting condition of the structure;

Figure 4 is a transverse sectional view through the brake structure taken substantially along the line IV—IV of Figure 2;

Figure 5 is a sectional view similar to Figure 4 but showing the relationship of parts in the brake releasing condition thereof;

Figure 6 is a vertical sectional view taken substantially along the line VI—VI of Figure 2;

Figure 7 is a vertical sectional detail view taken substantially along the line VII—VII of Figure 2; and Figure 8 is a fragmentary elevational view, partially in section, of a slightly modified form of the brake lever structure.

According to the present invention, a plurality of slidably related members are adapted to act upon applying a straight pull through the medium of a handle 10, to impart longitudinal brake setting movement to a drawbar 11 to which is secured a brake setting or take-off cable 12 of the brake system on the vehicle with which the brake lever structure is associated. Motion is transmitted from the handle 10 to the drawbar 11 through a telescopically related tube assembly including an actuator tube 13 and a setting tube 14, the latter being slidable within a tubular supporting bracket 15. A closure cap or dust guard 16 is carried by the rear end of the setting tube 14 and cooperates with the exterior of the tube 13 to close the space between the tubes. The bracket 15 is formed with coplanar oppositely extending attachment ears 17 adapted to be secured as by means of bolts 18 to the underturned flange of an instrument panel 19 of the vehicle. The actuator tube 13 projects rearwardly from telescoped relation with the setting tube 14 and has the handle 10 integrally secured on its outer reduced diameter end.

By preference, the body of the actuator tube 13 is of more or less rectangular, flattened cross section, with the opposite longitudinal edge portions thereof in slidable engagement with the setting tube 14. By this construction, the interior of the actuator tube 13 provides a telescopic guideway for the drawbar 11, which is preferably in the form of a U-shaped channel longitudinally slidable within the actuator tube 13 and projecting forwardly therefrom. Means such as a riveted pin 20 extending between the rear end portions of the side walls of the drawbar 11 affords anchorage for the take-off cable 12 looped thereabout substantially as shown in Figs. 1, 2 and 3.

Means is provided for effecting a connection between the actuator tube 13 and the setting tube 14, and between the drawbar 11 and the setting tube, so that when the handle 10 is pulled or pushed in a straight line within a certain range of reciprocal movement the entire tube and drawbar assembly will be reciprocated. For connecting the actuator and setting tubes together, such means comprises a ball detent 21 carried within a retainer 22 supported by a slightly offset portion 23 at the rear end of the setting tube 14 and engageable within an indented recess 24 in the lower edge of the actuating tube. Adjustable tension is adapted to be applied to the ball detent 21 by a coil spring 25 which at its opposite end seats on an adjusting screw 27 threaded into the retainer 22.

The connecting means between the drawbar 11 and the setting tube 14 comprises a dog 28 projecting through an opening 29 in the base wall or web of the drawbar and into interlocking engagement with an inwardly projecting interlocking lip flange 30 defining an opening 31 in the base of the tube 14. In additon to affording a simple connection between the drawbar 11 and the setting tube 14, the dog 28 is adapted to function as part of mechanism for compounding pressure at the end of the slack takeup phase of the brake setting movement of the brake lever structure to effect final setting or locking of the brake. Accordingly, the dog 28 is formed as an integral laterally projecting part adjacent to the forward end of a link 32 forming one part of a toggle having a flat ball and socket knee connection 33 with a co-operating rearwardly projecting link 34. As best seen in Figs. 2, 6 and 7, the toggle links 32 and 34 are slidably mounted within the drawbar 11, the forward end of the link 32 being secured pivotally by means such as a riveted pin 35 which is slidably retained within a longitudinally elongated slot 37 provided therefor in each of the side walls of the drawbar 11. Means such as a pin 38 extending through the rear end portion of the toggle link 34 and through appropriate bearing apertures 39 in the side walls of the drawbar provides a fixed pivot. With this arrangement, a normal brake-released condition of the brake lever structure finds the toggle 32 angled substantially as shown in Fig. 2. The normal tension of the takeoff cable 12 acting through the drawbar 11 and the connecting pin 35 causes tilting of the toggle link 35 by reason of the engagement of the eccentrically disposed dog 28 with the interlock flange 30, the pin 35 being in engagement with the rear end of the elongated bearing slots 37 in this condition of the mechanism.

Since the actuator tube 13 and the setting tube 14 are connected by the ball detent 21 brake setting outward or rearward pull upon the handle 10 causes the connected tubes to move together axially rearwardly. The interconnection afforded by the dog 28 causes the drawbar 11 to follow along with the setting tube 14, thereby taking up the slack in the brake system until a predetermined resistance is encountered in the takeoff cable 12 when the brake shoes engage the drums. In response to such resistance, the ball detent 21 leaves its recess 24, and the actuator tube 13 continues to move rearwardly with the handle 10 independently of the setting tube 14 to a predetermined extent until the detent 21 finds a limit socket 40 provided by an aperture in the lower edge of the actuating tube 13. In such independent movement, the actuating bar 13 draws a toggle-straightening cam 41 along the knee 33 to substantially straighten the toggle links 32 and 34, as shown in Fig. 3. This effects a limited rearward thrust upon the drawbar 11 through the connecting pin 35, as the dog 28 swings forwardly against the interlock flange 30, the connecting pin slots 37 affording a lost motion clearance for the connecting pin 35 during this action. In a convenient, inexpensive construction, the cam 41 may be formed from sheet metal into appropriate shape and welded to the inside of the upper edge wall of the actuating tube 13, a reinforcing wedge 43 affording a thrust relief for the cam. By having the cam 41 relatively long and of gradual slope, relatively powerful leverage is afforded in the toggle in response to only a moderate pulling effort applied to the handle 10. The distance the toggle thrust telescopes the drawbar 11 into the setting tube 14 is calculated to effect the final thorough setting of the brakes.

A locked condition of the toggle link 32 in the set condition thereof is afforded by a hold down flat 42 at the forward end of the cam 41 in engagement with the link 32 at the knee 33. This locking relationship is maintained by the interlock provided through engagement of the detent 21 in the socket 40 and which prevents accidental retraction of the actuator 13.

During the slack takeup portion of the brake setting linear action of the brake lever structure, the setting tube 14, of course, slides rearwardly in the supporting bracket 15, following the actuator tube 13. Unintentional return of the brake lever structure to brake releasing position is prevented by a ratchet mechanism, which in the present instance is especially positive and efficient through the provision of ratchets at the respective opposite sides of the setting tube 14 engageable with respective pawl blocks 45 supported by the bracket 15. For this purpose, the sides of the setting tube 14 are formed with longitudinal flat areas 47 (Fig. 4) in which the ratchet teeth are cut. These rachet teeth are relatively small and thus closely spaced so that quite fine incremental brake setting advance of the lever structure is afforded. Retaining means for the pawl blocks 45 in the bracket 15 comprise integral similar pockets 48 at the respective opposite sides of the bracket dimensioned to receive the pawl blocks in freely laterally slidable relation but holding the pawl blocks against movement in their plane. Resilient backing for the pawl blocks 45 is provided by spring means, in the present instance comprising blocks 49 of rubber-like material held under compression within the pockets 48 and acting normally to urge the pawl blocks 45 against the respective ratchets 44. In addition to serving as springs, the resilient blocks 49 also have a cushioning and sound damping effect in that sound-producing vibrations set up in the ratcheting interaction of the ratchet 44 and pawl blocks 45 are minimized and quite substantially dampened.

When the brake is to be released, simply partial turning of the handle 10 is adapted for successively disconnecting the detent 21 from the interlock socket 40 and then the ratchet teeth 44 from the blocks 45. In the present instance, this is accomplished by turning the handle counterclockwise and thereby rotating the actuator tube 13 within the setting tube 14 just enough to force the detent 21 out of interlock socket 40, as indicated in broken outline in Fig. 4. Thence the actuating lever 13 can be pushed forwardly within the setting tube 14 until the toggle cam 41 releases the toggle 32 and thereby unlocks the brake. Further counterclockwise turning of the handle 10 is effective to rotate the setting tube 14 in the bracket 15 by causing the actuating tube 13 to engage a limit stop protrusion 50 (Figs. 4 and 5) in the wall of the setting tube 14 to compel rotation of the setting tube in the further turning of the actuator tube, until the ratchets 44 are disengaged from the pawl blocks 45. Thereupon blank shoulders on the setting tube 14 hold the pawl blocks released and the spring blocks 49 compressed while the setting tube 14 is pushed forwardly therebetween until the brakes are fully slackened. Thereupon, a slight clockwise twist on the handle 10 quickly returns the telescoped actuator and setting tubes to their normal relationship, the compressed resilient blocks 49 releasing their energy against the pawl blocks 45 which are thus driven back into engagement with the ratchet teeth 44. At the same time the detent 21 reenters the socket 24 and reestablishes the initial relationship of the actuator and setting tubes. The yieldable pressure of the pawl blocks 45 on the flat sides 47 of the setting tube 14 hold it in the preferred normal rotary position in the bracket 15.

A limit upon the extent to which the setting tube 14 can be drawn rearwardly in setting the brake is afforded by an integral stop lip 51 formed on the forward end edge of the tube to engage with the opposing edge of the supporting bracket 15. A definite limit upon the extent to which the actuating tube 13 may telescope into the tube 14 is afforded by the adjacent portion of the interlock lip flange 30 acting as a stop engageable with the opposing inner edge of the actuating tube 13.

In a sense the present brake lever structure is self-adjusting to compensate for additional takeup as the brakes become worn since the initial adjustment can be so effectuated upon attachment of the takeoff cable 12 to the drawbar 11 that while the brakes are new ample spare length will be preserved in the forward portion of the setting tube 14. Then as the brakes wear down and the takeup accordingly lengthens there will still be sufficient extent of the ratchets 44 for effecting full takeup before the actuating tube 13 releases from the detent interlock 21, 24 for actuating the setting toggle 32, 34.

Where it is preferred to mount the brake lever structure more inconspicuously, or in order to afford more clearance under the instrument panel 19, an extension handle 52 may be provided which has an elongated stem 53 secured preferably relatively rotatably as by means of a pin 54 to appropriate ears 55 formed on the outer or rear end of a slightly modified actuating tube 56, the lever structure being in other respects like the form just described. A simple tubular bracket 57 provides a bearing hanger for the handle stem 53 and may be secured as by bolts 58 to the underturned flange of the instrument panel. The handle stem 53 may be as long as required.

It will, of course, be understood that various details of construction may be varied through a wide range without departing from the principles of this invention, and it is, therefore, not the purpose to limit the patent granted hereon otherwise than necessitated by the scope of the appended claims.

We claim as our invention:

1. In combination in a direct pull brake lever structure, telescopically related actuating and setting tubes carrying a drawbar therein adapted to be connected to a takeoff cable of a brake system, said tubes being jointly movable axially for slack takeup and being also independently relatively movable axially, and means co-operative with said tubes and said drawbar acting in the joint axial movement of the tubes to effect axial movement of the drawbar jointly with the tubes and operative as an incident to relative axial movement of the tubes to effect brake setting movement of the drawbar.

2. In combination in a direct pull brake lever structure, telescopically related actuating and setting tubes carrying a drawbar therein adapted to be connected to a takeoff cable of a brake system, said tubes being jointly movable axially for slack takeup and being also independently relatively movable axially, means co-operative with said tubes and said drawbar acting in the joint axial movement of the tubes to effect axial movement of the drawbar jointly with the tubes and operative as an incident to relative axial movement of the tubes to effect brake setting movement of the drawbar, and means for effecting a locked condition of the brake lever structure when the brakes have been set thereby.

3. In combination in a straight pull brake lever structure, jointly and relatively axially movable telescopically related tubular members adapted to be moved jointly axially in response to a straight pull for slack takeup, and a toggle carried by said members and operative in response to relative movement thereto of one of said members for imparting a brake setting thrust to the other of said members to actuate the latter relative to said one member.

4. In combination, a tube affording an operating element, a drawbar in said tube, means for connecting said operating element and said drawbar including a toggle linkage, said connecting means being operative to effect joint movement of the drawbar with the operating element for a predetermined distance, and a toggle operator carried by the tube and operative for actuating the linkage to effect setting movement of the drawbar toward the operating element in the continuing movement of the operating element.

5. In combination in a manually operable direct pull brake lever structure, a linearly movable actuating tube, a linearly movable setting tube carrying the actuating tube, a draw member carried by the actuating tube, means releasably connecting said actuating and setting tubes for joint linear movement and responsive to predetermined resistance to release the tubes for relative linear movement, and means operative in the relative linear movement of said actuating and setting tubes to produce a brake setting thrust in said draw member augmenting manual effort applied to move said tubes.

6. In combination in a direct pull brake lever structure, an actuating member, a draw member carried by the actuating member, and means connecting said members for joint linear brake setting motion responsive to manual exertion, said means including a toggle link assembly operative to impart a supplementary brake setting thrust to said draw member responsive to said manual effort.

7. In combination in a direct pull brake lever structure, an actuator tube having a handle at its rear end, a setting tube having the actuator tube telescoped therein and projecting forwardly therebeyond, a drawbar slidably mounted within said actuator tube and extending forwardly therefrom and adapted to have a takeoff cable secured to its forwardly extending end, a toggle link connection between said drawbar and said setting tube, means for connecting said tubes for joint brake-takeup linear motion in response to a pull on said handle and adapted to release said tubes for relative longitudinal movement in response to resistance of the brake system following slack takeup, and a cam actuated by said actuating tube in such relative axial movement of the tubes for actuating said toggle link to impart a brake setting thrust to said drawbar relative to the setting tube.

8. In combination in a direct pull brake lever structure, an actuator tube having a handle at its rear end, a setting tube having the actuator tube telescoped therein and projecting forwardly therebeyond, a drawbar slidably mounted within said actuator tube and extending forwardly therefrom and adapted to have a takeoff cable secured to its forwardly extending end, a toggle link connection between said drawbar and said setting tube, means for connecting said tubes for joint brake-takeup linear motion in response to a pull on said handle and adapted to release said tubes for relative longitudinal movement in response to resistance of the brake system following slack takeup, and a cam actuated by said actuating tube in such relative axial movement of the tubes for actuating said toggle link to impart a brake setting thrust to said drawbar relative to the setting tube, said setting tube having ratchet means thereon for holding it in slack takeup and brake setting position.

9. In combination in a straight pull brake lever structure, a flattened elongated actuator tube, a second tube having said actuator tube longitudinally and oscillatably slidable therein, a drawbar longitudinally slidably received within said actuator tube and projecting therefrom for connection of a takeoff cable leading to the brake system controlled by the lever structure, a toggle including a dog affording a connection between said drawbar and said setting tube, and a toggle-actuating device carried by said actuator tube.

10. In combination in a straight pull brake lever structure, a flattened elongated actuator tube, a second tube having said actuator tube longitudinally and oscillatably slidable therein, a drawbar longitudinally slidably received within said actuator tube and projecting therefrom for connection of a takeoff cable leading to the brake system controlled by the lever structure, a toggle including a dog affording a connection between said drawbar and said setting tube, a toggle-actuating device carried by said actuator tube, and a detent adapted to hold said tubes in relatively telescoped relation for joint linear movement to effect slack takeup in the brake system and releasable in response to brake resistance to permit independent protractional movement of the actuator tube for effecting operational movement of said actuating device to activate the toggle and drive said drawbar for brake setting and locking.

11. In combination in a straight pull brake lever structure, a flattened elongated actuator tube, a second tube having said actuator tube longitudinally and oscillatably slidable therein, a drawbar longitudinally slidably received within said actuator tube and projecting therefrom for connection of a takeoff cable leading to the brake system controlled by the lever structure, a toggle including a dog affording a connection between said drawbar and said setting tube, a toggle-actuating device carried by said actuator tube, and a detent adapted to hold said tubes in relatively telescoped relation for joint linear movement to effect slack takeup in the brake system and releasable in response to brake resistance to permit independent protractional movement of the actuator tube for effecting operational movement of said actuating device to activate the toggle and drive said drawbar for brake setting and locking, said actuating tube having a socket therein for receiving said detent at the limit of protractional relative movement of the tubes for locking the tubes, and said cam having a locking surface engageable with the toggle to hold the latter in brake locking position while said tubes are locked together in the protracted condition.

12. In combination in a brake lever structure, jointly and independently longitudinally movable members adapted for setting a brake in response to a straight pull manual effort, a detent structure for holding said members jointly movable but responsive to brake resistance to release the members for independent relative longitudinal movement to a limited extent and being then operative to lock the members against return to the initial relationship thereof, means operative in the relative movement of said members for effecting a brake lock, means for holding one of said members in brake setting condition, said detent structure and said holding means being releasable by respective relative and joint turning of said members.

13. In combination in a direct pull brake lever structure of the character described, jointly and independently movable elongated members, means for connecting the members for joint longitudinal movement and being pressure-releasable to permit the members to move relative to one another longitudinally, ratchet mechanism co-operative with one of said members for holding it in selected brake slack takeup position, means operative in the independent longitudinal movement of said members for brake locking action, said members being relatively rotatable for releasing said brake locking means and being jointly rotatable to release said ratchet mechanism.

14. In combination in a direct pull brake lever structure, an actuator member, setting means cooperatively related to the actuator member for joint rectilinear brake takeup movement therewith and for relative brake locking movement effected in the continuing movement of the actuator member, a supporting bracket carrying said actuator member, a handle on said actuator member, said handle including an elongated stem connected to said actuator member to adapt the structure for placement relatively remote from the handle, and means located remote from the supporting bracket for supporting said stem slidably.

15. In combination in a brake lever structure, an elongated longitudinally movable member, said member having a series of relatively fine ratchet teeth disposed on a flat area of substantial width and length on said member, a guide structure for said member and having a shallow rectangular pocket opening toward and of substantially the same width as said ratchet toothed flat area, a flat pawl block having a toothed flat face of substantially the same area as the mouth of the pocket and opposing said flat area and guided for in and out movement at the mouth of said pocket for engagement and release from said ratchet teeth, and resilient means between the opposite flat face of said pawl block and the bottom of said pocket for normally urging said block into ratcheting engagement with said teeth, said member being angularly movable to place an untoothed area thereof beside said flat toothed area into non-ratcheting engagement with the toothed face of the block and thereby release the member for free sliding longitudinal movement.

16. In combination in a brake lever structure, an elongated longitudinally movable member, said member having a series of relatively fine ratchet teeth disposed on a flat area of said member, a guide structure for said member and having a rectangular pocket opening toward said ratchet toothed flat area, a flat pawl block having a toothed flat face of substantial area opposing said flat area and guided for in and out movement at the mouth of said pocket for engagement and release from said ratchet teeth, and a resilient flat rubber block between the opposite flat face of said pawl block and the bottom of said pocket for normally urging said block into ratcheting engagement with said teeth, said flat rubber block being of smaller dimension than said pawl block and having clearance from the sides of said pocket to afford compression expansion space therefor in the inward release movements of the pawl block and compression of the rubber block.

17. In combination in a brake lever structure, a pair of jointly and relatively longitudinally movable telescoped members, the outer of the telescoped members having a releasable detent structure cooperating with detent engageable structure on the inner of the members for releasably holding the members for joint longitudinal movement, and structure for longitudinally guiding the outer of said members and including means for ratcheting interengagement with said outer member to retain the same in selective longitudinal relative positions, said inner member being releasable from said detent structure by turning thereof relative to the outer member, and said outer member being arranged to be turned by action of said inner member for releasing said ratchet means.

18. In combination in a brake lever structure, an elongated tubular member adapted for longitudinal brake setting movement, a drawbar carried within said tubular member and of elongated and generally U-shape cross sectional form, flat toggle link members cooperatively related and riding movably within said drawbar between the sides thereof, one of said toggle link members being pivotally connected to the drawbar sides and the other of said toggle link members being pivotally connected to said tubular member, and means for actuating the toggle linkage to effect relative longitudinal movement of the drawbar and the tubular members.

19. In combination in a straight acting brake lever structure, a pair of telescopically related tubes, a drawbar carried within the inner of said tubes, said drawbar having a toggle link assembly pivotally connected to one end thereof and having means at the other end for connection of a brake cable, said toggle link also having pivotal connection with the inner of said tubes, a dog on the toggle linkage engageable with the outer of said tubes, and means for actuating the toggle linkage upon relative longitudinal movement of the tubes for driving said drawbar to effect brake setting motion thereof relative to said tubes.

HERBERT S. JANDUS.
WALTER BANTA.

REFERENCES CITED

The following references are of record in the file of this patent:

UNITED STATES PATENTS

| Number | Name | Date |
| --- | --- | --- |
| 344,363 | Emenhiser | June 29, 1886 |
| 1,716,657 | O'Connor | June 11, 1929 |
| 1,718,258 | Schmidt | June 25, 1929 |
| 2,058,541 | Wilshusen | Oct. 27, 1936 |
| 2,085,427 | Elliott | June 29, 1937 |
| 2,101,160 | Weber | Dec. 7, 1937 |
| 2,180,215 | Saunders et al. | Nov. 14, 1939 |
| 2,202,125 | Temple | May 28, 1940 |
| 2,240,783 | Jandus | May 6, 1941 |
| 2,251,893 | Snell | Aug. 5, 1941 |
| 2,285,941 | Oberhoffken | June 9, 1942 |

FOREIGN PATENTS

| Number | Country | Date |
| --- | --- | --- |
| 542,724 | Great Britain | Jan. 26, 1942 |